United States Patent [19]

Mizukoshi et al.

[11] Patent Number: 4,881,056
[45] Date of Patent: Nov. 14, 1989

[54] FACEDOWN-TYPE SEMICONDUCTOR PRESSURE SENSOR WITH SPACER

[75] Inventors: Masahito Mizukoshi, Nagoya; Eishi Kawasaki; Takeshi Miyajima, both of Kariya; Takeshi Fukazawa, Tokyo, all of Japan

[73] Assignee: Nippondenso Co., Ltd., Kariya, Japan

[21] Appl. No.: 180,134

[22] Filed: Apr. 11, 1988

[30] Foreign Application Priority Data

Apr. 9, 1987 [JP] Japan .................................. 62-87696
Jul. 7, 1987 [JP] Japan .................................. 62-169283

[51] Int. Cl.$^4$ .............................................. G01L 1/22
[52] U.S. Cl. .......................................... 338/4; 338/42
[58] Field of Search ........................ 338/4, 36, 42, 2; 73/727

[56] References Cited

U.S. PATENT DOCUMENTS 4,068,206 1/1978 Popp .................................. 338/4 X

FOREIGN PATENT DOCUMENTS 55-15293 2/1980 Japan .

Primary Examiner—Clifford C. Shaw
Assistant Examiner—M. M. Lateet
Attorney, Agent, or Firm—Cushman, Darby & Cushman

[57] ABSTRACT

A facedown-type semiconductor pressure sensor has a Si sensing element including a diaphragm, a spacer, and a piezoresistive device embedded in the diaphragm, and a pedestal. The spacer, which is positioned between the semiconductor substrate and the pedestal, has a photolitho-graphically etched hole such that the sensing element, the hole and the pedestal define a sealed chamber. The sealed pressure chamber is substantially aligned with the diaphragm.

28 Claims, 4 Drawing Sheets

FACEDOWN-TYPE SEMICONDUCTOR PRESSURE SENSOR WITH SPACER

BACKGROUND OF THE INVENTION

1. Field of the Invention

This invention relates generally to pressure sensors, and particularly to facedown-type semiconductor pressure sensors for high pressure.

2. Prior Art

FIG. 7 is a sectional view of a conventional facedown-type semiconductor pressure sensor. This semiconductor pressure sensor generally comprises a Si substrate 21 and a pedestal 23. The Si substrate 21 has a thin diaphragm portion 25B which is made by boring the Si substrate 21 from one surface 26, and has an insulating layer 22 on the other surface thereof. Piezoresistive devices are provided in the central region 25A of the insulating layer 22 such that the piezoresistive devices are protected by the insulating layer 22. The other surface of the Si substrate 21 is connected, via the insulating layer 22, to the pedestal 23 having a concave portion 24. Therefore, the opening of the concave portion 24 is closed by the insulating layer 22, and the concave portion 24 operates as a sealed pressure chamber. The concave portion 24 is positioned just under the diaphragm portion 25B such that the side wall 24C of the concave portion 24 is positioned just under the side wall 25C of the diaphragm portion 25B. A pressure which is to be measured is applied to the diaphragm 25B, then pressure difference between the pressure in the sealed pressure chamber 24 and the applied pressure to the diaphragm 25B is detected by the piezoresistive devices.

In the manufacturing process of the above-described conventional pressure sensor, however, the side wall 25C of the diaphragm portion 25B cannot be correctly positioned in accordance with the position of the side wall 24C of the sealed pressure sensor 24. As a result, stress distribution in the diaphragm 25B and in the piezoresistive devices is changed between finished pressure sensors. More specifically, in the conventional facedown-type semiconductor pressure sensors, the connection of the substrate 21 and the pedestal 23 cannot be correctly performed. Therefore, there is a disadvantage that the characteristics of the pressure sensors are not uniformed throughout a number of the products.

SUMMARY OF THE INVENTION

The present invention has been developed in order to remove the above-described drawback inherent to the conventional facedown-type semiconductor pressure sensor.

It is, therefore, an object of the present invention to provide a new and useful facedown-type semiconductor pressure sensor.

It is another object of the invention to provide a facedown-type semiconductor pressure sensor having no variety of an output characteristic among finished products thereof.

It is a further object of the invention to provide a facedown-type semiconductor pressure sensor in which a diaphragm portion and a sealed pressure chamber is correctly positioned.

In accordance with the present invention there is provided a facedown-type semiconductor pressure sensor comprising: a semiconductor substrate having a recess in one surface thereof; layer means formed on the other surface of said semiconductor substrate; a spacer formed on said layer means, a through-hole being made in said spacer, said spacer being positioned so that said through-hole is coaxial with said recess; a pedestal to which said spacer is fixed such that a sealed pressure chamber is defined by said through-hole between said layer means and said pedestal; piezoresistive means embeded in said layer means, said piezoresistive means being positioned between said recess and said sealed pressure chamber; and electrode means connected to said piezoresistive means for obtaining output from said piezoresistive means.

In accordance with the present invention there is also provided semiconductor pressure sensor comprising: a glass pedestal having a flat surface; spacer means formed on said flat surface; a sensing element connected to said glass pedestal via said spacer means, said element having a flat surface, a Si diaphragm, a device determining a resistive value thereof in accordance with a pressure, and said device being provided at the side of said flat surface of said element; and a sealed pressure chamber being defined by said glass pedestal, said spacer means, and said sensing element.

In accordance with the present invention there is further provided a facedown-type semiconductor pressure sensor comprising: a glass pedestal; a sensing element for detecting a pressure, including: a Si substrate having a diaphragm which is destorted by said pressure applied thereto; an insulating layer provided on said Si substrate; a polysilicon layer provided on said insulating layer; a piezoresistive region formed to said polysilicon layer; and a protection film for protecting said piezoresistive region, said film being provided on said polysilicon layer and said piezoresistive region; spacer means for connecting said glass pedestal and said sensing element; and a reference pressure chamber defined by said glass pedestal, said sensing means, and said spacer.

BRIEF DESCRIPTION OF THE DRAWING

The object and features of the present invention will become more readily apparent from the following detailed description of the preferred embodiments taken in conjunction with the accompanying drawings in which:

The same or corresponding elements and parts are designated at like reference numerals throughout the drawings.

In FIGS. 1 and 2, the present pressure sensor generally comprises a Si substrate 1 having a circular recess 16 at one side thereof, a spacer 7 which is formed of a thin film and is provided at the other side thereof via a sensing element 100, and a pedestal 10 made of borosilicate glass. The sensing element 100 including the Si substrate 1, an insulating layer 2 made of silicon oxide provided on the Si substrate 1, a polysilicon layer 3 provided on the insulating layer 2, and a protection film 6 made of silicon oxide provided on the polysilicon layer 3. Piezoresistive devices 4a, 4b, 4c, and 4d (see also FIG. 2), which determine a resistive value in accordance with a pressure applied thereto, are embeded in the polysilicon layer 3 in the sensing element 100. Therefore, a thin portion 16B of the Si substrate 1, a part of the insulating layer 2, a part of the polysilicon layer 3, and a part of the protection film 6 all operate as a diaphragm 16A which is destorted by a pressure applied thereto. The piezoresistive devices 4a and 4b are provided at desired positions in the polysilicon layer 3 in the diaphragm 16A, and low-resistance regions 5 is also provided therein as shown in FIG. 2. The pedestal 10 is connected to the spacer 7 whereby a sealed pressure chamber 17 is defined by the sensing element 100, the spacer 7, and the pedestal 10. The pressure in the sealed pressure chamber 17 is a reference pressure.

Figure 1:
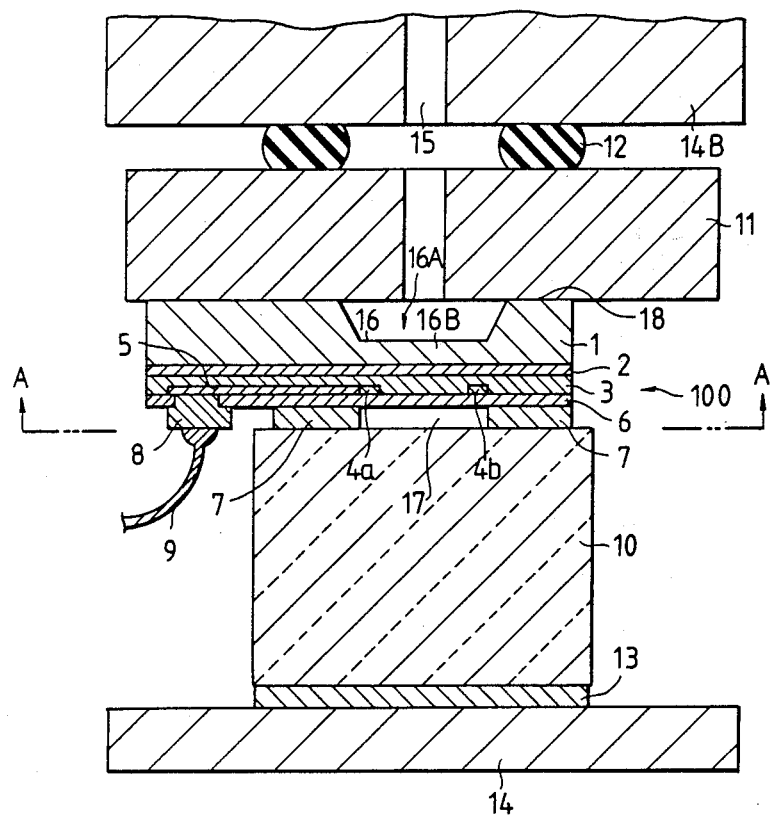
FIG. 1 is a sectional view of a facedown-type semiconductor pressure sensor according to a first embodiment of the present invention.
Figure 2:
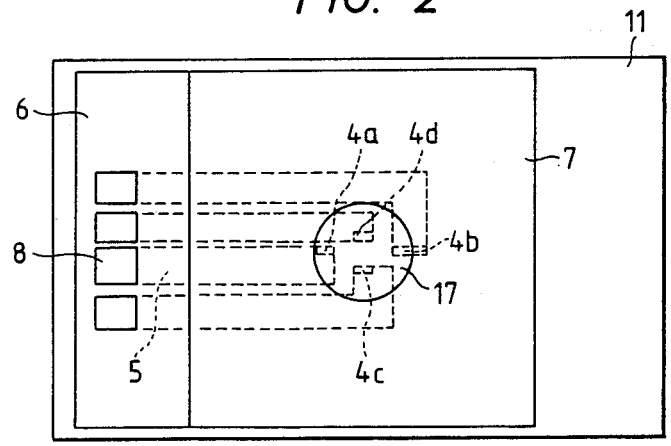
FIG. 2 shows a top plan view taken along the line A—A in FIG. 1.

The manufacturing process of the present pressure sensor having the above-mentioned structure will be described hereinbelow. First, the insulating layer 2 such as a silicon oxide layer is formed on the Si substrate 1, and the polysilicon layer 3 is formed on the insulating layer 2 with a chemical vapour deposition (CVD) method. The low-resistance regions 5 is also formed in the polysilicon layer 3 by diffusing an impurity such as phosphorus or boron so that the low-resistance regions 5 extend from each of the piezoresistive devices 4a, 4b, 4c, and 4d almost to an end of the sensing element 100. Secondly, the protection film 6 such as a silicon oxide film and another polysilicon thin layer for spacer 7 are formed with the CVD method. The portions which is to be made parts corresponding to the diaphragm portion 16A and bonding pad portions 8 are etched away by a lithography technique. Therefore, the remaining polysilicon layer is used as the spacer 7. At this time, the spacer 7 is ring-shape corresponding to the shape of the diaphragm portion 16A. The thickness of the spacer 7 is dependent on the detected pressure, and is preferably 1.5–2.0 $\mu$m. It is to be noted that the positioning of spacer 7 is performed with precision in which the error of the positioning is ±3 $\mu$m. Thirdly, the portion which is to form the bonding pads 8 at the protection film 6 is etched away so that the low-resistance regions 5 are exposed in such etched portion. The bonding pads 8, which are made of aluminum, are formed to this opening on each of the low-resistance regions 5. Then, the thin portion 16B of the Si substrate 1 is formed by an anisotropic etching method with potassium hydroxide (KOH) aqueous solution. Finally, wires 9 such as Au wires are connected to the bonding pads 8, and the pedestal 10 is connected to the spacer 7 by an anodic bonding technique. In the first embodiment, the pedestal 10 is further connected to the housing 14 by an adhesive 13, and the one surface 18 of the Si substrate 1 is also connected to a sealing spacer 11 which is connected to another housing 14B via an O-ring 12.

In addition, since the thickness of the spacer 7 is adjustable, the diaphragm portion 16A can be prevented from breaking. More specifically, if the pressure which is to be measured is very high, since the diaphragm portion 16A is contacted to the pedestal 10, an excessive displacement thereof is limited by such a contact surface of the pedestal 10.

Next, the operation of the first embodiment of the present invention will be described hereinbelow. The piezoresistive devices 4a, 4b, 4c, and 4d in the diaphragm portion 16A is distorted by the pressure difference between the reference pressure in the sealed pressure chamber 17 and the pressure to be measured from the through-hole 15, thereby causing a change of resistance value. The change of the resistance value is detected and obtained in the following way. For example, four piezoresistive devices 4a, 4b, 4c, and 4d are electrically connected with each other as a bridge circuit. The output from the bridge circuit is obtained through the low-resistance regions 5 and the wires 9 as the change of the resistive value when the pressure is applied thereto.

Besides, a channel (not shown) can be provided in the pedestal 10 from the sealed pressure chamber 17 to outside thereof in order that another reference pressure is applied thereto. In addition, the sealed pressure chamber 17 is sealed and a concave portion is made in the pedestal 10 just like the above-mentioned conventional pressure sensor. Therefore, even if a gas exists in the sealed pressure chamber 17, disadvantageous effect caused by the gas can be reduced. In this case, the spacer 7 is not provided to the peripheral edge of the concave portion preferably. Moreover, the protection film 6 and the spacer 7 can be formed of the same material and by the same process, and the center portion corresponding to the diaphragm portion 16A does not necessarily have to be formed by completely etching the layer for spacer 7. The pedestal 10 preferably has the same coefficient of thermal expansion as that of the Si substrate 1 and the piezoresistive devices 4a, 4b, 4c, and 4d can also be provided on the Si substrate 1.

Figure 3:
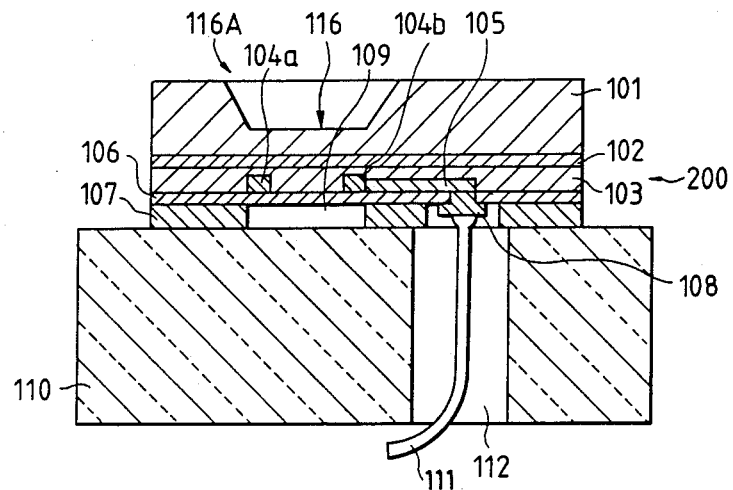
FIG. 3 is a sectional view of a facedown-type semiconductor pressure sensor according to a second embodiment of the present invention.
Figure 4:
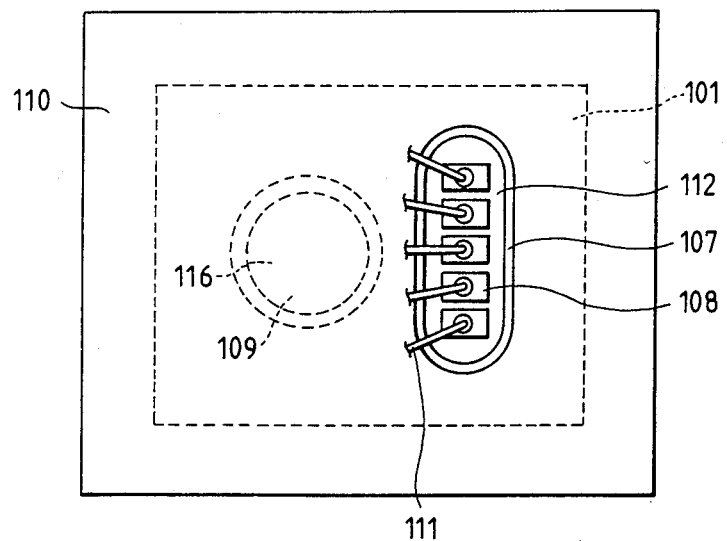
FIG. 4 shows a top plan view of the second embodiment.

Now a second embodiment of the present invention will be described with reference to FIGS. 3 and 4. The pressure sensor of the second embodiment generally comprises a substrate 101 having a recess 116A at one side thereof, a spacer 107 which is formed of a thin film and which is connected to the other side thereof via sensing element 200, and a pedestal 110 having a trough-hole 112. The sensing element 200 includes the substrate 101, an insulating layer 102 provided on the Si substrate 101, a polysilicon layer 103 provided on the insulating layer 102, and a protection film 106 provided on the polysilicon layer 103. Piezoresistive devices 104a, 104b, etc. are embedded in the polysilicon layer 103, and are provided at desired positions of the diaphragm region 116, and a low-resistance region 105 is also provided therein as shown in FIG. 3. The pedestal 110 is connected to the spacer 107 whereby a sealed pressure chamber 109 is defined by the sensing element 200, the spacer 107, and the pedestal 110. The pressure in the sealed pressure chamber 109 is a reference pressure. The spacer 107 has a hole for bonding pads 108. The low-resistance region 105 is connected, via the bonding pads 108, to wires 111 such as Au wires which pass through a through-hole 112 of the pedestal 110.

In the second embodiment, since the bonding pads 108 and the wires 111 are protected by the through-hole 112, the through-hole 112 prevents the bonding pads 108 from another material such as oil. In addition, since the wires 111 are led through only one through-hole 112, the size of the bonding pads 108 and the pedestal 110 can be minimized. In the case of the second embodiment, the through-hole 112 is approximately 2mm at minimum, thereby obtaining a high pressure sensor having a pressure-proof value of approximately 1500kgf/cm$^2$, because a compressive stress around the through-hole 112 is reduced. Therefore, since the number of parts thereof are reduced, the size of the present pressure sensor can be minimized, and the spacer 107 and the pedestal 110 can be easily connected each other with low manufacturing cost.

Figure 5:
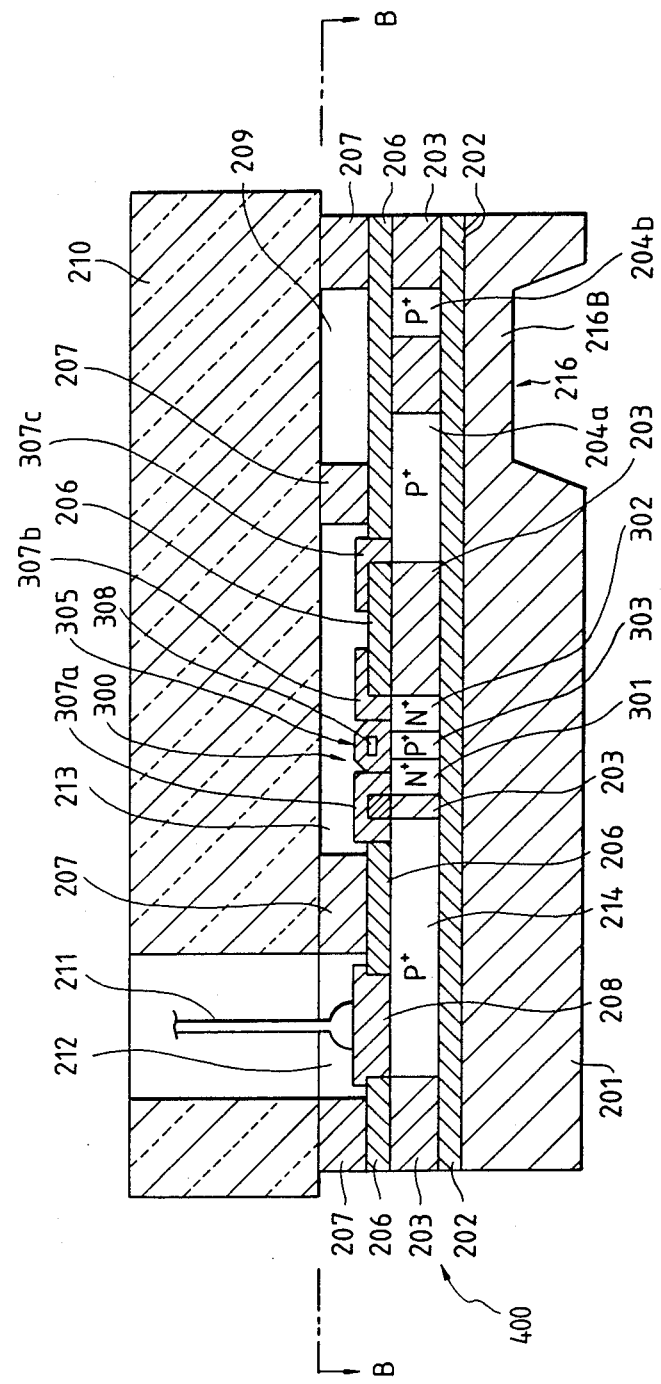
FIG. 5 is a sectional view of a facedown-type semiconductor pressure sensor according to a third embodiment of the present invention.
Figure 6:
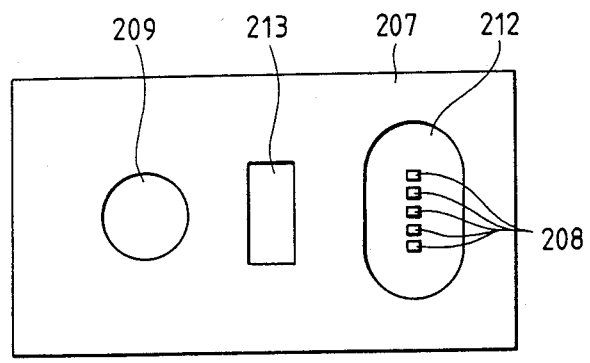
FIG. 6 shows a top plan view taken along the line B—B of FIG. 5.
Figure 7:
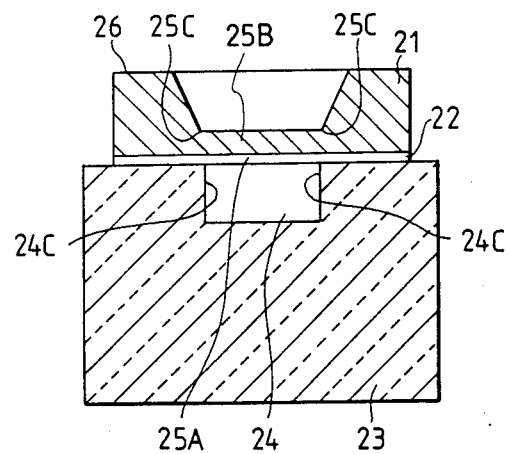
FIG. 7 is a sectional view showing a conventional facedown-type semiconductor pressure sensor.

Next, a third embodiment of the present invention will be described with reference to FIGS. 5 and 6. The pressure sensor of the third embodiment generally comprises a substrate 201 made of single crystal Si having a diaphragm portion 216 at one side thereof, a spacer 207 which is formed of thin film and which is provided at the other side thereof via sensing element 400, and a pedestal 210 having a trough-hole 212. The sensing element 400 generally includes an insulating layer 202 such as silicon oxide layer having a thickness of 0.5 μm provided on such a Si substrate 201, a polysilicon layer 203 made of high resistance polysilicon having a thickness of 0.3 μm provided on the insulating layer 202, and a protection film 206 formed of silicon oxide having a thickness of 0.6 μm provided on the polysilicon layer 203. The diaphragm portion 216 includes a thin portion 216B of the Si substrate 201, a part of the insulating layer 202, a part of the polysilicon layer 203, and a part of the protection film 206. Piezoresistive regions 204A, 204B, etc. made of polysilicon, a peripheral circuit region 300, and output regions 214 are provided at desired positions in the polysilicon layer 203.

The peripheral circuit region 300 is provided between the piezoresistive regions 204a, 204b, etc. and the bonding pads 208, and operates as a circuit for amplifying output signal from the piezoresistive regions 204a, 204b, etc. and for performing a temperature compensation. The output regions 214 are formed of P+polysilicon, and conducts output signal from the peripheral circuit region 300, via bonding pads 208 made of Al, to wires 211 made of Au. Each of the piezoresistive regions 204a, 204b, etc. have an impurity concentration of $10^{20}/cm^3$, and the output region 214 has an impurity concentration of $5 \times 10^{20}/cm^3$. The peripheral circuit region 300 includes Al wires 307a, 307b, and 307c, an NMOS transistor 305 having active regions such as an N+source region 301, an N+drain region 302, and P-type channel region 303, and a polysilicon gate electrode 308 on a gate insulating layer (not shown) on the P-type channel region 303.

The spacer 207 is formed by photo-etching the polysilicon layer having a thickness of approximately 2 μm laminated on the protection film 206. As shown in FIG. 6, the spacer 207 has three holes for the sealed pressure chamber 209, a sealed space 213 for accommodating convexes of the peripheral circuit region 300, and the through-hole 212 are respectively defined by the three holes of the spacer 207, the insulating layer 206, and the pedestal 210. The pedestal 210 is made of borosilicate glass, and is connected to the spacer 207 by an anodic bonding technique. The pedestal 210 has also a through-hole for the wires 211.

As described above, since the present facedown-type pressure sensor has the peripheral circuit region 300 in the sealed space 213 at a side which the piezoresistive regions 204a, 204b, etc. are, the contact surface between the pedestal 210 and the spacer 207 can be flat so that the pedestal 210 and the spacer 207 can be strongly bonded using an anodic bonding technique, for example. Furthermore, since the peripheral circuit region 300 is protected thereby, signal-to-noise ratio of the present pressure sensor is not deteriorated.

In the third embodiment, although the sealed space 213 accommodates the NMOS transistor 305, a MOS transistor or a bipolar transistor may be provided therein. Besides, it is not necessary that the sealed space 213 be completely sealed. The high resistance polysilicon layer 203 isolating the active regions 301, 302, and 303, and the piezoresistive regions 204a, 204b, etc., and the output regions 214 can be formed of an insulating layer such as a semi-insulating polycrystalline silicon (SIPOS) layer. In addition, the substrate 201 is not limited to a single crystal Si substrate, and the sealed chamber 209 can be defined by spacer 207 having a recess and sensing element 400. The impurity concentration of the piezoresistive regions 204a, 204b, etc. can be changed, and may be assumed the same value as that of the output region 203. Moreover, the piezoresistive regions 204a, 204b, etc. can be formed of a laser-annealed polycrystalline Si film or another film having a piezoresistive effect, and can be formed in the single crystal Si substrate 201.

The above-described embodiments are just examples of the present invention, and therefore, it will be apparent for those skilled in the art that many modifications and variations may be made without departing from the scope of the present invention.

What is claimed is:

1. A facedown-type semiconductor pressure sensor comprising:
   (a) a sensing element having:
      (i) a semiconductor substrate having in one surface a recess for receiving an applied pressure to be measured, said recess being formed such that a thin portion is provided in said semiconductor substrate at a place corresponding to a bottom of said recess;
      (ii) layer means formed on the other surface of said semiconductor substrate, said thin portion and a portion of said layer means corresponding to said thin portion forming a diaphragm;
      (iii) a spacer having a hole therein formed on said layer means, said hole being substantially coaxial with said recess;
      (iv) piezoresistive means embedded in said diaphragm to produce an output in accordance with displacement of said diaphragm caused by application of the pressure to be measured; and
      (v) electrode means connected to said piezoresistive means for obtaining the output from said piezoresistive means, and
   (b) a pedestal to which said spacer is fixed such that a pressure chamber is defined by said hole and a surface of said pedestal, said pedestal supporting said layer means through said spacer.

2. A sensor as claimed in claim 1, wherein said spacer is provided by photolithography to have said hole therein.

3. A sensor as claimed in claim 1, wherein said layer means including an insulating layer made of silicon oxide, a polysilicon layer, and a protecting film made of silicon oxide.

4. A sensor as claimed in claim 3, wherein said piezoresistive means is embedded in said polysilicon layer.

5. A sensor as claimed in claim 1, wherein said pedestal is made of borosilicate glass.

6. A sensor as claimed in claim 1, wherein a surface of said pedestal defining said pressure chamber is flat, a thickness of said spacer being determined to be equal to a maximum value of said displacement.

7. A sensor as claimed in claim 1, wherein said spacer formed of polysilicon thin film.

8. A sensor as claimed in claim 1, wherein said spacer has a thickness of approximately 1.5–2.0 μm.

9. A sensor as claimed in claim 1, wherein said spacer has a through-hole, and said pedestal has a through-hole connected to said through-hole of said spacer and said electrode means comprising an output line which is provided through said through-holes of said spacer and said pedestal to externally output said output.

10. A sensor as claimed in claim 9, wherein said layer means further includes circuit means provided between said piezoresistive means and said electrode means.

11. A sensor as claimed in claim 10, wherein said spacer has a third through-hole for accommodating convexes of said circuit means.

12. A semiconductor pressure sensor comprising:
    (a) a glass pedestal having a flat surface;
    (b) spacer means formed on said flat surface;
    (c) a sensing element connected to said glass pedestal via said spacer means, said element having a flat surface, a Si diaphragm, a device determining a resistive value thereof in accordance with a pressure, and said device being provided at the side of said flat surface of said element; and
    (d) a sealed pressure chamber being defined by said glass pedestal, said spacer means, and said sensing element.

13. A facedown-type semiconductor pressure sensor comprising:
    (a) a glass pedestal;
    (b) a sensing element for detecting a pressure, including:
        (i) an Si substrate having a diaphragm which is distorted by said pressure applied thereto;
        (ii) an insulating layer provided on said Si substrate;
        (iii) a polysilicon layer provided on said insulating layer;
        (iv) a piezoresistive region formed to said polysilicon layer; and
        (v) a protection film for protecting said piezoresistive region, said film being provided on said polysilicon layer and said piezoresistive region;
    (c) spacer means for connecting said glass pedestal and said sensing element; and
    (d) a reference pressure chamber defined by said glass pedestal, said sensing means, and said spacer, said spacer provided on said pedestal supporting said sensing element.

14. A facedown-type semiconductor pressure sensor comprising:
    (a) a semiconductor substrate having a recess subjected to a pressure to be measured in one surface thereof, said recess being formed such that a thin portion is provided in said semiconductor substrate at a place corresponding to a bottom of said recess;
    (b) layer means formed on the other surface of said semiconductor substrate, said thin portion and a portion of said layer means corresponding to said thin portion forming a diaphragm;
    (c) a spacer made of a first material formed on said layer means having a hole, an inner side wall of said hole being positioned at a place corresponding to the bottom of said recess;
    (d) a pedestal, made of a second material which is different from said first material, to which said spacer is fixed such that a pressure chamber is defined by at least said inner side wall and a surface of said pedestal, said pedestal supporting said layer means through said spacer;
    (e) piezoresistive means positioned between said recess and said pressure chamber to produce an output in accordance with displacement of said diaphragm caused by said pressure; and
    (f) electrode means connected to said piezoresistive means for obtaining said output from said piezoresistive means.

15. A sensor as claimed in claim 14, wherein said spacer is provided by photolithography to have said hole therein.

16. A sensor as claimed in claim 14, wherein said layer means including an insulating layer made of silicon oxide, a polysilicon layer, and a protecting film made of silicon oxide.

17. A sensor as claimed in claim 16, wherein said piezoresistive means is embedded in said polysilicon layer.

18. A sensor as claimed in claim 14, wherein said second material is borosilicate glass.

19. A sensor as claimed in claim 14, wherein a surface of said pedestal defining said pressure chamber is flat, a thickness of said spacer being determined to be equal to a maximum value of said displacement.

20. A sensor as claimed in claim 14, wherein said first material is a polysilicon thin film.

21. A sensor as claimed in claim 14, wherein said spacer has a thickness of approximately 1.5–2.0 m.

22. A sensor as claimed in claim 14, wherein said spacer has a through-hole positioned in a portion of said spacer being different from said hole, and said pedestal has a through-hole connected to said through-hole of said spacer and said electrode means comprises an output line which is provided through said through-hole of said spacer and said pedestal to externally output said output.

23. A sensor as claimed in claim 22, wherein said layer means further includes circuit means provides between said piezoresistive means and said electrode means.

24. A sensor as claimed in claim 23, wherein said spacer has a second through-hole for accommodating convexes of said circuit means.

25. A sensor as claimed in claim 14, wherein said pressure chamber is sealed.

26. A sensor as claimed in claim 14, wherein said hole is a through-hole.

27. A sensor as claimed in claim 26, wherein said pressure chamber is defined by said inner side wall of said through-hole, said surface of said pedestal, and a surface of said layer means.

28. A sensor as claimed in claim 14, wherein said piezoresistive means embedded in said layer means.

* * * * *